United States Patent
Suido et al.

(10) Patent No.: US 9,581,953 B2
(45) Date of Patent: Feb. 28, 2017

(54) ROTARY DRIVE DEVICE AND IMAGE FORMING APPARATUS

(71) Applicants: Naoyuki Suido, Kanagawa (JP); Keisuke Shimizu, Tokyo (JP); Hiroaki Takagi, Kanagawa (JP); Kimiharu Yamazaki, Kanagawa (JP); Tadahiro Satoh, Kanagawa (JP)

(72) Inventors: Naoyuki Suido, Kanagawa (JP); Keisuke Shimizu, Tokyo (JP); Hiroaki Takagi, Kanagawa (JP); Kimiharu Yamazaki, Kanagawa (JP); Tadahiro Satoh, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/019,232

(22) Filed: Feb. 9, 2016

(65) Prior Publication Data
US 2016/0238981 A1    Aug. 18, 2016

(30) Foreign Application Priority Data
Feb. 12, 2015    (JP) .................................. 2015-024989

(51) Int. Cl.
G03G 15/01    (2006.01)
G03G 15/00    (2006.01)
(Continued)

(52) U.S. Cl.
CPC .......... G03G 15/757 (2013.01); F16D 1/076 (2013.01); F16H 57/0025 (2013.01)

(58) Field of Classification Search
USPC ................. 399/130, 159, 167, 297–302, 308; 74/412 R, 413; 475/331, 337, 345
See application file for complete search history.

(56) References Cited

U.S. PATENT DOCUMENTS

2002/0169047 A1*  11/2002  Hiraku ..................... F16H 3/54
                                                    475/206
2008/0271556 A1*  11/2008  Imamura ........... F16H 57/02004
                                                    74/412 R
(Continued)

FOREIGN PATENT DOCUMENTS

JP    2008-014438    1/2008
JP    2009-173365    8/2009
(Continued)

Primary Examiner — Hoan Tran
(74) Attorney, Agent, or Firm — Harness, Dickey & Pierce, P.L.C.

(57) ABSTRACT

A rotary drive device includes a drive motor and drive transmission portion, which transmits a rotational drive force of the motor to a driven rotor and includes three or more drive transmission members. A high stiffness member is attached to a low-stiffness drive transmission member, which is one, lower in stiffness, of two of the drive transmission members, to increase stiffness of the low-stiffness drive transmission member. The two form a drive transmission point corresponding to a resonant point of a lowest resonance frequency among frequencies at a plurality of resonance points in frequency response characteristics derived from rotation information. One drive transmission point, which is on either a drive-transmission input side or output side, other than the drive transmission point corresponding to the resonant point of the lowest resonance frequency, of the low-stiffness drive transmission member is configured to transmit the rotational drive force through the high stiffness member.

18 Claims, 6 Drawing Sheets

(51) Int. Cl.
 *F16H 57/00* (2012.01)
 *F16D 1/076* (2006.01)

(56) References Cited

U.S. PATENT DOCUMENTS

| | | |
|---|---|---|
| 2009/0185846 A1 | 7/2009 | Okamoto |
| 2010/0232819 A1 | 9/2010 | Kudo et al. |
| 2012/0060633 A1 | 3/2012 | Ishida et al. |
| 2012/0190489 A1 | 7/2012 | Takagi |
| 2012/0196720 A1 | 8/2012 | Miyawaki et al. |
| 2013/0017924 A1 | 1/2013 | Shimizu et al. |
| 2013/0020753 A1* | 1/2013 | Ito .................... B65H 85/00 271/10.13 |
| 2013/0175963 A1* | 7/2013 | Yamada .................... H02P 6/24 318/468 |
| 2013/0260952 A1 | 10/2013 | Matsuda et al. |

FOREIGN PATENT DOCUMENTS

| | | |
|---|---|---|
| JP | 2009-179441 | 8/2009 |
| JP | 2013-253680 | 12/2013 |

\* cited by examiner

ROTARY DRIVE DEVICE AND IMAGE FORMING APPARATUS

CROSS-REFERENCE TO RELATED APPLICATIONS

The present application claims priority to and incorporates by reference the entire contents of Japanese Patent Application No. 2015-024989 filed in Japan on Feb. 12, 2015.

BACKGROUND OF THE INVENTION

1. Field of the Invention

The present invention relates generally to a rotary drive device and an image forming apparatus including the same.

2. Description of the Related Art

Conventionally, a rotary drive device configured to reduce variation in rotation speed of a drive motor, which transmits its rotational drive force to a driven rotor via a drive transmission portion such as a gear, by controlling a drive signal to be fed to the drive motor based on a rotation speed of the driven rotor detected using an encoder, which is a rotation information detector, is known.

For example, Japanese Laid-open Patent Application No. 2013-253680 discloses a rotary drive device, in which a disk-type encoder is attached to a driven gear on a driven shaft of a driven rotor. The driven gear is brought into mesh with a drive gear on a drive shaft of a drive motor. A rotation speed of the drive motor is feedback-controlled based on rotation information about the driven gear detected using a sensor arranged at a radially outer side of the encoder, thereby causing the driven rotor to achieve a target rotation speed.

The rotary drive device disclosed in Japanese Laid-open Patent Application No. 2013-253680 has, on a drive transmission path transmitting the rotational drive force of the drive motor to the driven rotor, drive transmission points including a mesh between the drive gear and the driven gear, a coupling between the driven gear and a parallel pin, and an insertion connection where the parallel pin is fitted in the driven shaft to be rotatable jointly with the driven shaft. At these points, periodic transmission variations occur, causing a plurality of resonance points to appear in frequency response characteristics derived from the rotation information obtained from the sensor. It is generally desired that feedback control be performed at a frequency sufficiently lower than a lowest one of resonance frequencies at the plurality of resonance points to avoid influence of resonance at the lowest resonance frequency. However, to increase the degree of freedom in design of a feedback control system, it is generally desirable to widen the control range in the feedback control.

In the rotary drive device disclosed in Japanese Laid-open Patent Application No. 2013-253680, first torsional stiffness at a mesh between the drive gear and the driven gear is set to be higher than second torsional stiffness at a coupling between the driven gear and the parallel pin. With this rotary drive device, a gain (i.e., amplification factor (the ratio of output amplitude to input amplitude in the encoder)) of resonance at a resonance point of a lowest resonance frequency in frequency response characteristics obtained when the drive motor is driven is lower than a gain of a configuration where the first torsional stiffness is set to be equal to the second torsional stiffness and a gain of a configuration where the first torsional stiffness is set to be lower than the second torsional stiffness. As a result, because influence of resonance at the resonance point can be reduced, even if the frequency of the feedback control for the drive motor is set close to the lowest resonance frequency, the feedback control can be performed favorably. Thus, according to Patent Document 1, because the feedback control frequency can be set close to the lowest resonance frequency, a control range of the feedback control can be widened.

If the lowest resonance frequency in the frequency response characteristics can be increased, the frequency (i.e., the feedback control frequency), at which periodic variation in rotation speed of the drive motor is sampled, can be set high. As a result, the control range, which is the range of applicable frequencies, of the feedback control can be widened. The technique disclosed in Japanese Laid-open Patent Application No. 2013-25368 can lower the gain at the resonance point of the lowest resonance frequency and reduce the influence of resonance at the resonance point, thereby bringing the feedback control frequency close to the lowest resonance frequency and, accordingly, can increase the feedback control frequency. However, because the lowest resonance frequency remains the same, the control range of the feedback control for the drive motor is not widened sufficiently.

It is an object of the present invention to at least partially solve the problem in the conventional technology.

SUMMARY OF THE INVENTION

It is an object of the present invention to at least partially solve the problems in the conventional technology.

According to exemplary embodiments of the present invention, there is provided a rotary drive device comprising: a drive motor; a drive transmission portion configured to transmit a rotational drive force of the drive motor to a driven rotor; and a rotation information detector configured to detect rotation information of the driven rotor, a drive signal to be fed to the drive motor being controlled based on the rotation information of the driven rotor obtained by the rotation information detector so as to cause a rotation speed of the drive motor to achieve a target rotation speed, the drive transmission portion including three or more drive transmission members, a high stiffness member being attached to a low-stiffness drive transmission member, the low-stiffness drive transmission member being one, the one being lower in stiffness, of two drive transmission members forming a drive transmission point corresponding a resonant point of a lowest resonance frequency among frequencies at a plurality of resonance points in frequency response characteristics derived from the rotation information of the drive transmission members, to increase stiffness of the low-stiffness drive transmission member, one drive transmission point of the low-stiffness drive transmission member, the one drive transmission point being on any one of a drive-transmission input side and a drive-transmission output side, other than the drive transmission point corresponding to the resonant point of the lowest resonance frequency being configured to transmit the rotational drive force through the high stiffness member.

Exemplary embodiments of the present invention also provide an image forming apparatus comprising: a plurality of driven rotors; and rotary drive units each configured to exert a rotational drive force to a corresponding one of the driven rotors, each of the rotary drive units being the above-described rotary drive device.

The above and other objects, features, advantages and technical and industrial significance of this invention will be better understood by reading the following detailed descrip-

DETAILED DESCRIPTION OF THE PREFERRED EMBODIMENTS

An image forming apparatus according to an embodiment of the present invention is described below by way of example of an electrophotographic printer (hereinafter, simply referred to as "printer").

Figure 1:
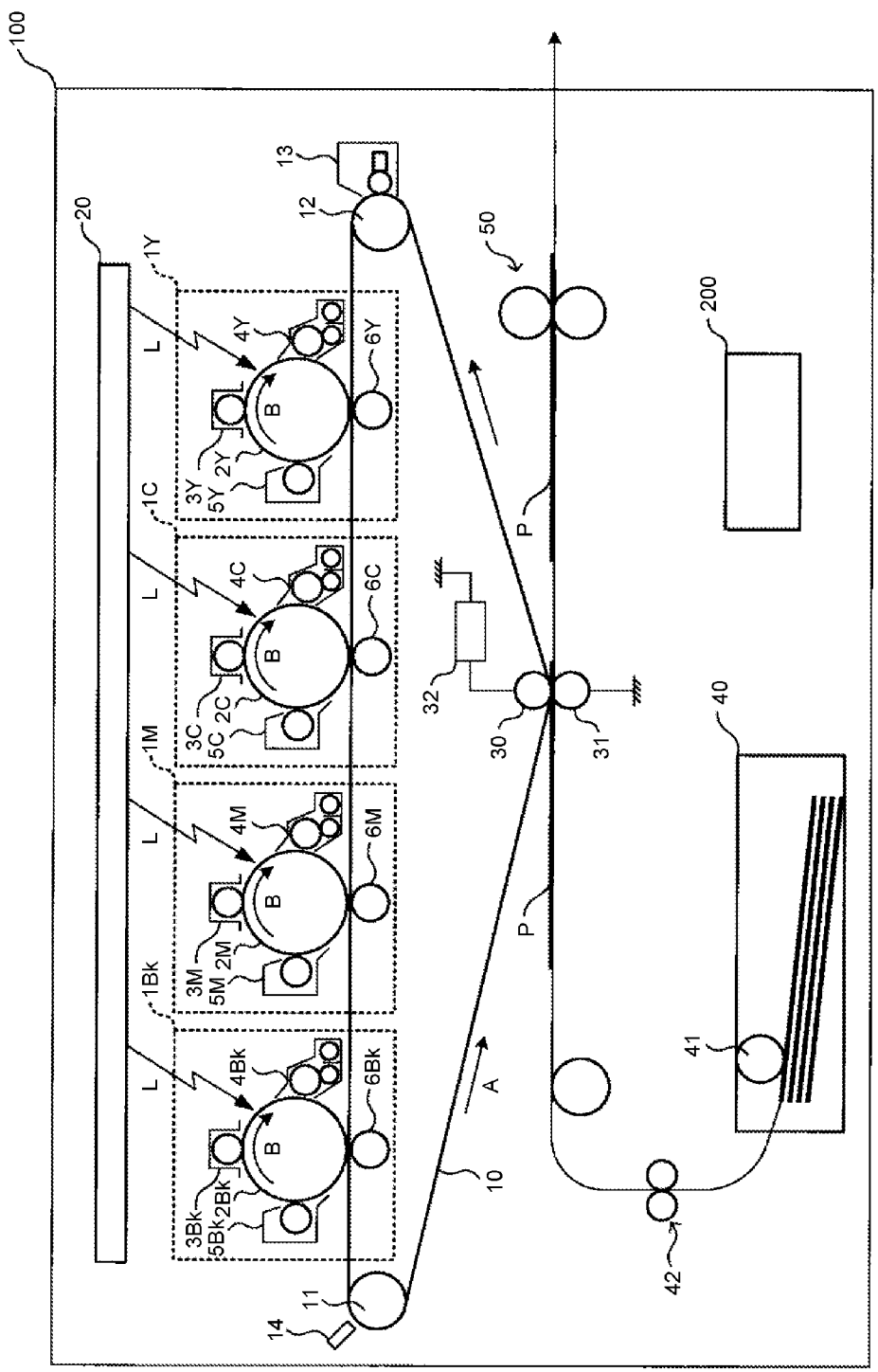
FIG. 1 is a schematic configuration diagram of a printer according to an embodiment.

FIG. 1 is a schematic diagram of the printer. Overview of a full-color image forming apparatus of a four-color system is described below as the printer. A printer 100 is a tandem color-image forming apparatus, in which four image forming units denoted by 1Bk, 1M, 1C, and 1Y are arranged along a running direction of an intermediate transfer belt 10. No limitation is imposed on the number of the colors, and image forming units using five or more colors may alternatively be employed. The image forming unit of each color charges a surface of a photoconductor with a charging device, forms an electrostatic latent image with an exposure device, and forms a toner image with a developing device. These devices are held by a same holder and jointly attached to or detached from a main body of the apparatus, so that these devices can be replaced simultaneously. Hereinafter, reference symbols Bk, M, C, Y are used to denote members for black, magenta, cyan, and yellow, respectively. A mechanism of the image forming unit is described below by way of example of the image forming unit for yellow (Y).

In the image forming unit 1Y, a charging device 3Y, a developing device 4Y, a photoconductor cleaning device 5Y, and a charge neutralizing device are arranged around a photoconductor 2Y serving as a latent image bearer. The image forming units 1Bk, 1M, and 1C are configured as is the image forming unit 1Y. The photoconductor 2Y is shaped like a drum, in which an organic photoconductive layer is formed on a surface of a drum base, and driven by a rotary drive device. The charging device 3Y has a roller shape and receives application of a charging bias. The charging device 3Y is configured to cause discharge to occur between the charging device 3Y and the photoconductor 2Y while being brought into contact with or proximity of the photoconductor 2Y, thereby uniformly charging the surface of the photoconductor 2Y. In the present embodiment, the charging device 3Y uniformly charges the surface to the negative polarity, which is the same as normal charging polarity of toner. As the charging bias, a voltage obtained by superimposing an alternating-current voltage on a direct-current voltage is used. The charging device 3Y is formed by covering a surface of a metal cored bar with a conductive elastic layer made of a conductive elastic material. In lieu of the scheme of bringing a charging member such as a charging roller into contact with or proximity of the photoconductor 2Y, a scheme using a charging charger may be employed.

The uniformly-charged surface of the photoconductor 2Y is optically scanned with laser light L emitted from an optical writing unit 20 to bear an electrostatic latent image thereon. The optical writing unit 20, which is latent-image writing means, is arranged above the image forming units. The optical writing unit 20 optically scans the photoconductor 2Y with the laser light L emitted from a laser diode in accordance with image information. By this optical scanning, an electrostatic latent image is formed on the photoconductor 2Y. More specifically, potential on the uniformly-charged surface of the photoconductor 2Y is attenuated at areas irradiated with the laser light L. As a result, the electrostatic latent image, in which the potential at the laser-irradiated areas is lower than the other area (i.e., background portion), is formed. The optical writing unit 20 is configured to irradiate the photoconductor 2Y with the laser light L emitted from the light source via a plurality of optical lens(es) and mirror(s) while deflecting the laser light L in the main-scanning direction using a polygon mirror rotated by a polygon motor. An optical writing unit configured to perform optical writing with LED (light-emitting diode) light emitted from a plurality of LEDs of an LED array may alternatively be employed.

The electrostatic latent image formed on the photoconductor 2Y is developed into a toner image, which is a visible image, by the developing device 4Y by causing charged toner to stick to the electrostatic latent image. The developing device 4Y includes a developing portion, which internally includes a developing roller, and a developer conveyor for conveying developer while stirring the same. The developer conveyor includes a screw member including a rotary shaft member, which is rotatably supported on bearings at its both axial ends, and a helical blade spirally projecting from a peripheral surface of the rotary shaft member. As the screw member rotates, developer is stirred and conveyed to the developing roller. The developer conveyor includes, on a bottom wall of its casing, a toner density sensor. The toner density sensor detects toner density of the developer in the developer conveyor. As the toner density sensor, a sensor based on a magnetic permeability sensor is used. Because magnetic permeability of the developer, which contains toner and magnetic carrier particles, has a correlation with the toner density, the toner density can be detected using the magnetic permeability sensor. The printer 100 includes toner supply means for supplying toner to the developer conveyor of the developing device 4.

A main-body controller 200 of the image forming apparatus stores in a RAM a target value for an output voltage value of the toner density sensor. If the difference between an output voltage value of the toner density sensor and the target value exceeds a predetermined value, the main-body controller 200 drives the toner supply means only for a duration, which depends on the difference. Toner is supplied to the developer conveyor in the developing device 4Y in this manner. The developing roller housed in the developing portion not only faces the screw member but also faces the photoconductor 2Y through an opening provided in the casing.

The developing roller includes a tubular developing sleeve, which is made from a nonmagnetic pipe and driven to rotate, and a magnet roller fixed to the inside of the developing sleeve so as not to rotate with the sleeve. The developing roller bears the developer on a surface of the sleeve with a magnetic force applied from the magnet roller and conveys the developer supplied from the screw member to a developing area facing the photoconductor 2Y as the sleeve rotates. A developing bias, which has the same polarity as the toner and which is higher in potential than the electrostatic latent image on the photoconductor 2Y but lower than the uniformly-charged potential of the photoconductor 2Y, is applied to the developing sleeve. Accordingly, a developing potential, which causes the toner on the developing sleeve to electrostatically move toward the electrostatic latent image on the photoconductor 2Y, acts between the developing sleeve and the electrostatic latent image. Furthermore, a non-developing potential, which causes the toner on the developing sleeve to move along the surface of the sleeve, acts between the developing sleeve and the background portion of the photoconductor 2Y.

The action of the developing potential and the non-developing potential causes the toner on the developing sleeve to be selectively transferred onto the electrostatic latent image on the photoconductor 2Y, thereby developing the electrostatic latent image into a toner image. The apparatus uses a developing system using the two-component developer containing toner and carrier particles. Alternatively, the apparatus may use a developing system using a one-component developer containing only toner. The toner image is developed on the photoconductor 2Y in this manner and, thereafter, transferred onto the intermediate transfer belt 10, which is an intermediate transfer member. The photoconductor cleaning device 5Y removes transfer-residual toner left on the intermediate transfer belt 10 after the toner image has been transferred onto the intermediate transfer belt 10, thereby cleaning the photoconductor surface. Thereafter, the charge neutralizing device, e.g., a charge neutralizing lamp, initializes the surface potential on the surface of the photoconductor 2Y. As the photoconductor cleaning device 5Y, any one of or a combination of a cleaning blade, a cleaning roller, and a cleaning brush can be used. Furthermore, the cleaning effect may be enhanced by applying a voltage of the polarity opposite to that of the toner to such a cleaning member.

The printer 100 is an image forming apparatus of an intermediate transfer system configured to transfer a toner image formed on the photoconductor onto the intermediate transfer belt 10 and thereafter transfer the toner image from the intermediate transfer belt 10 to a print medium. Although a belt-type intermediate transfer member is employed as the intermediate transfer member, a drum-shaped intermediate transfer member may alternatively be employed. The printer 100 includes, in addition to the intermediate transfer belt 10, which is an image bearer, a drive roller 11, a driven roller 12, a secondary-transfer counter roller 30, four primary transfer rollers denoted by 6Y, 6C, 6M, and 6Bk, a secondary transfer roller 31, a belt cleaning device 13, and a potential sensor 14 below the image forming units 1Bk, 1M, 1C, and 1Y.

The intermediate transfer belt 10 is supported by the drive roller 11, the secondary-transfer counter roller 30, the driven roller 12, and the four primary transfer rollers denoted by 6Y, 6C, 6M, and 6Bk arranged inside a loop of the intermediate transfer belt 10 in a stretched condition. The intermediate transfer belt 10 is moved circularly and endlessly in the direction indicated by arrow A in FIG. 1 by a rotational force of the drive roller 11 driven to rotate by a driver, which is a rotary drive device of the present embodiment. Each of the four primary transfer rollers denoted by 6Y, 6C, 6M, and 6Bk and a corresponding one of the photoconductors 2Y, 2C, 2M, and 2Bk sandwich the circularly-moving intermediate transfer belt 10 therebetween. Primary transfer nip areas where the outer surface of the intermediate transfer belt 10 are in contact with the photoconductors 2Y, 2C, 2M, and 2Bk are thus formed.

A primary transfer bias is applied from a transfer-bias power supply to each of the primary transfer rollers 6Y, 6C, 6M, and 6Bk. The primary transfer bias induces a transfer electric field between each of the electrostatic latent images on the photoconductors 2Y, 2C, 2M, and 2Bk and a corresponding one of the primary transfer rollers 6Y, 6C, 6M, and 6Bk. The primary transfer rollers 6Y, 6C, 6M, and 6Bk are movable to be separated from the intermediate transfer belt 10. When transferring only a Bk image, the image forming units for colors other than Bk are moved to be separated from the intermediate transfer belt 10. Each of the primary transfer rollers 6Y, 6C, 6M, and 6Bk is an elastic roller including a metal cored bar and a conductive foam layer fixed onto the surface of the cored bar. The primary transfer bias controlled to a substantially constant voltage or constant current is applied to the primary transfer rollers 6Y, 6C, 6M, and 6Bk configured as described above. In lieu of each of the primary transfer rollers 6Y, 6C, 6M, and 6Bk, a transfer charger, a transfer brush, or the like may be employed.

As the photoconductor 2Y rotates in the direction indicated by arrow B in FIG. 1, the intermediate transfer belt 10 advances to the primary transfer nip area for Y toner where primary transfer of the Y-toner image onto the intermediate transfer belt 10 is performed by the action of the transfer electric field and a nip pressure. Thereafter, the intermediate transfer belt 10 passes through the primary transfer nip areas for C, M, and Bk one by one. Primary transfer of transferring the C-, M-, and Bk-toner images on the photoconductors 2C, 2M, and 2Bk onto the intermediate transfer belt 10 one by one on one another is performed. Thereafter, the toner images on the intermediate transfer belt 10 are transferred from the intermediate transfer belt 10 to a print medium P at a secondary transfer portion. At the secondary transfer portion, a nip area is formed by sandwiching the intermediate transfer belt 10 between the secondary-transfer counter roller 30 arranged inside the loop of the intermediate transfer belt 10 and the secondary transfer roller 31. The print medium P advances to between the intermediate transfer belt 10 and the secondary transfer roller 31 of the nip area. While the secondary transfer roller 31 is grounded, a secondary transfer bias is applied from a secondary-transfer-bias power supply 32 to the secondary-transfer counter roller 30. Accordingly, a secondary-transfer electric field, which electrostatically moves the toner having the negative polarity from the secondary-transfer counter roller 30 toward the secondary transfer roller 31, is induced between the secondary transfer roller 31 and the secondary-transfer counter roller 30. The secondary-transfer-bias power supply 32 includes a direct-current power supply and applies a voltage, which is controlled to substantially constant voltage or constant current and has the same polarity as the normal charging polarity of the toner, to the secondary-transfer counter roller 30.

A paper feeding cassette 40 containing a bundle of a plurality of sheets of the print medium P is arranged at a lower portion in the printer 100. In the paper feeding cassette 40, an uppermost sheet of the print medium P is in contact with a paper feeding roller 41. The paper feeding roller 41 is driven to rotate with predetermined timing to deliver the print medium P to a paper feeding path. A pair of registration rollers 42 is arranged near a downstream end of the paper feeding path. The pair of registration rollers 42 stops rotating immediately when the print medium P delivered from the paper feeding cassette 40 is pinched between the registration rollers. The pair of registration rollers 42 resumes rotating with timing adjusted to bring the print medium P pinched therebetween into synchronization with the toner images on the intermediate transfer belt 10, thereby delivering the print medium P toward the secondary transfer nip area. The overlaid toner images of the four colors on the intermediate transfer belt 10 are brought into close contact with the print medium P at the secondary transfer nip area and jointly transferred onto the print medium P by the action of the secondary-transfer electric field and a nip pressure to form a full-color toner image. The toner image on the print medium P is fixed with heat by a fixing device 50 and ejected out of the apparatus.

The main-body controller 200 controls operations of various elements, which are included in the main body of the printer 100 and require operation control, and devices included in the elements. The main-body controller 200 is described below with reference to FIG. 2.

Figure 2:
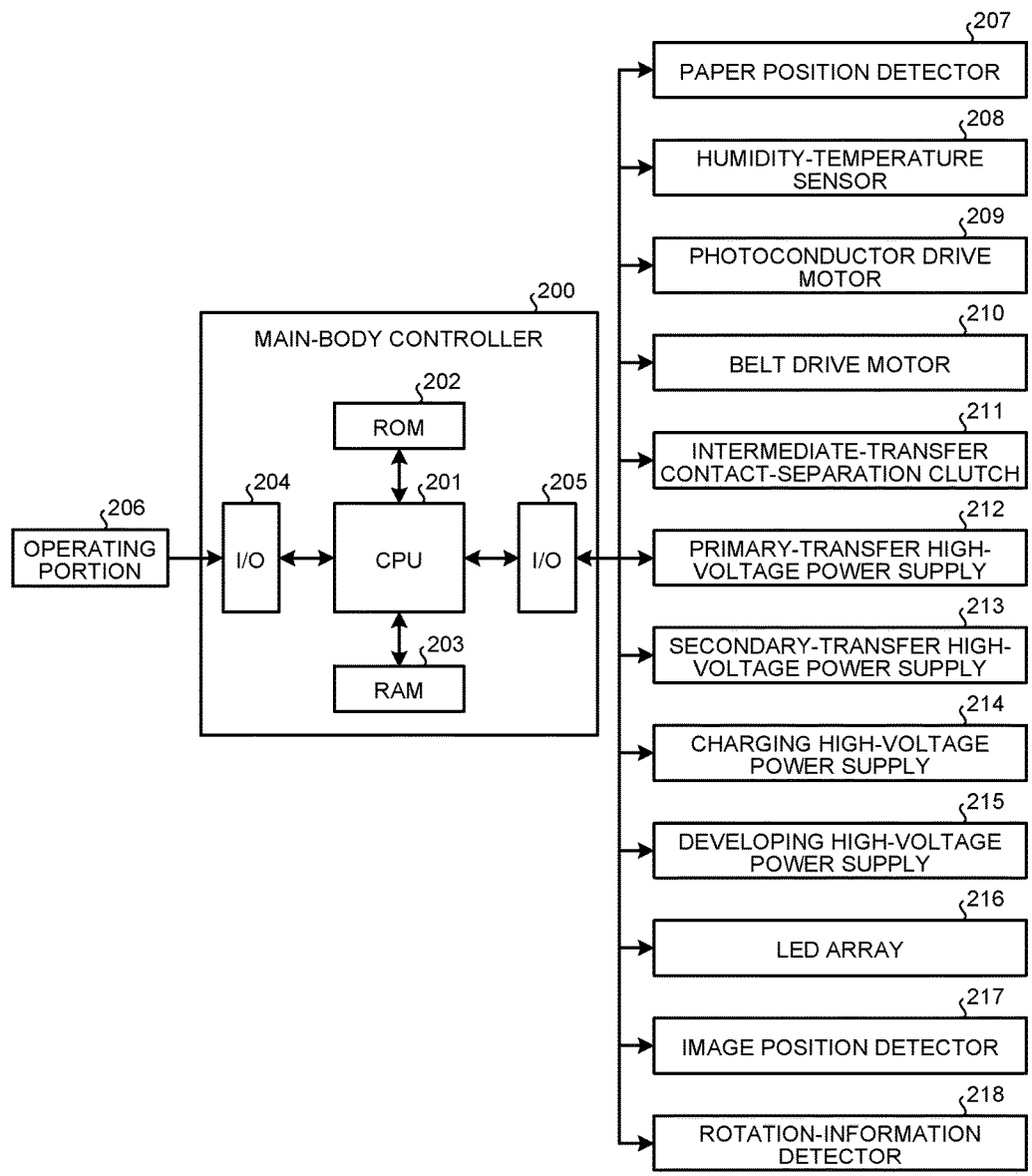
FIG. 2 is an explanatory diagram of a control system of the printer.

FIG. 2 is an explanatory diagram of a control system of the printer 100. As illustrated in FIG. 2, the main-body controller 200 includes a CPU (central processing unit) 201, memories, and I/O (input/output) ports 204 and 205. The memories include a ROM 202 and a RAM 203. The I/O port 204 is connected to an operating portion 206. The I/O port 205 is connected to a paper position detector 207, a humidity-temperature sensor 208, a photoconductor drive motor 209, a belt drive motor 210, an intermediate-transfer contact-separation clutch 211, a primary-transfer high-voltage power supply 212, a secondary-transfer high-voltage power supply 213, a charging high-voltage power supply 214, a developing high-voltage power supply 215, an LED array 216, an image position detector 217, a rotation-information detector 218, and the like.

Implementation Example

An implementation example of the rotary drive device of the above-described embodiment is described below.

Figure 3:
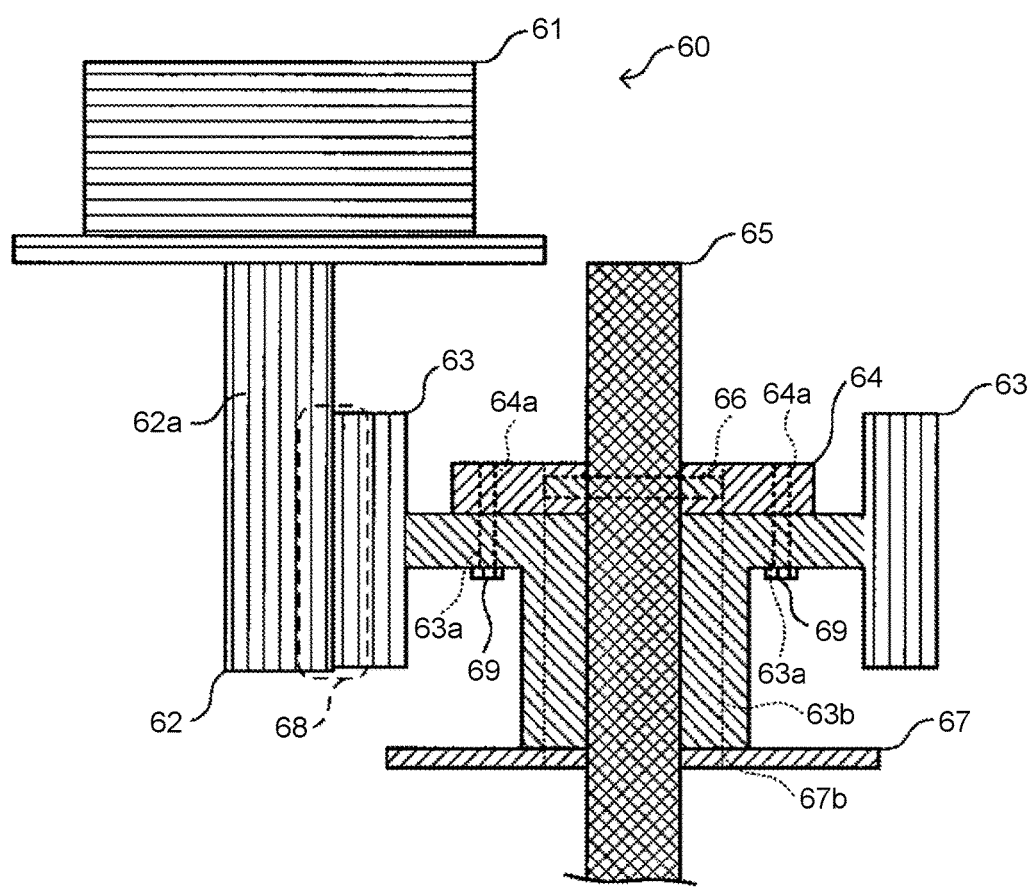
FIG. 3 is a schematic cross-sectional view describing a configuration of a rotary drive device of an implementation example.
Figure 4A:
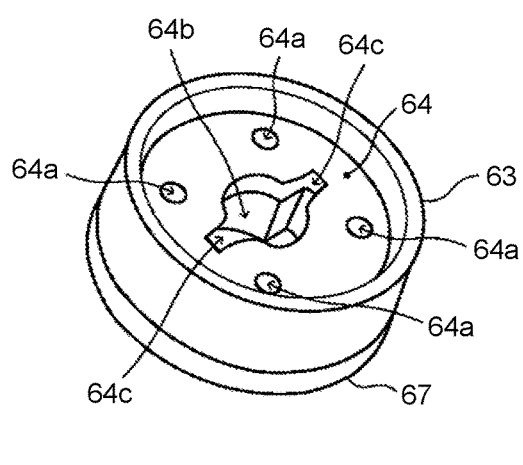
FIGS. 4A, 4B, and 4C are respectively a perspective view of an intermediate transfer gear of a drive transmission portion as viewed from a metal member, a perspective view of the intermediate transfer gear as viewed from an encoder, and a see-through view of the intermediate transfer gear.
Figure 4B:
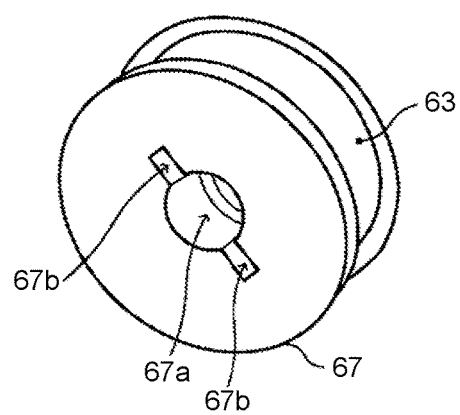
Figure 4C:
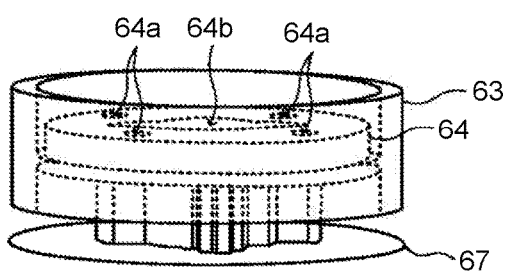

FIG. 3 is a schematic cross-sectional view describing a configuration of the rotary drive device of the present implementation example. FIGS. 4A, 4B, and 4C are diagrams describing a structure of an intermediate transfer gear of a drive transmission portion. FIG. 4A is a perspective view as viewed from a metal member. FIG. 4B is a perspective view as viewed from an encoder. FIG. 4C is a see-through view of the intermediate transfer gear.

The higher the frequency of feedback control for a drive motor than a frequency of variation in rotation speed of the drive motor, the more accurately the rotation speed can be adjusted to a target rotation speed. A drive transmission unit generally includes a plurality of drive transmission portions on a drive transmission path and has, on the drive transmission path, a plurality of resonance frequencies including a gear meshing frequency(ies), torsion of a member(s), and the like produced at the drive transmission portions. A feedback control system is desirably designed so as to set a frequency range of feedback control lower than a lowest one of such resonance frequencies. If the feedback control system is designed otherwise, rotation information serving as feedback information undesirably contains, in addition to variation in rotation speed (hereinafter, "rotational variation") of a drive motor, influence of a resonance frequency on the drive transmission path. This can lead to a failure in appropriately canceling out the rotational variation of the drive motor by the feedback control. In short, if the feedback control is performed in a frequency range higher than the lowest resonance frequency, transmission variation caused by the resonance frequency is contained in feedback information, causing the feedback control to fail to stabilize rotation of the drive motor.

Furthermore, in a condition where amplitude at the lowest resonance frequency on the drive transmission path is high (i.e., gain is high), the feedback control frequency is desirably set to a frequency still lower than the lowest resonance frequency to avoid influence of resonance. This is because it is necessary in design of a control system so as to guarantee a gain margin.

Hence, the feedback control frequency is desirably set to a frequency sufficiently lower than the lowest resonance frequency on the drive transmission path. Meanwhile, to increase the feedback control frequency to thereby reduce the rotational variation of the drive motor more accurately, it is desired to increase the lowest resonance frequency on the drive transmission path as high as possible and to lower the gain at the lowest resonance frequency.

The lowest resonance frequency and its gain depend on stiffness of a drive transmission member of a corresponding drive transmission portion. Examples of a factor affecting the lowest resonance frequency and its gain include torsional stiffness of the intermediate transfer gear, which is a driven gear, and stiffness of an insertion connection between a drive gear and the intermediate transfer gear. The intermediate transfer gear is made of a resin material for the reason of low cost and ready formability. A plurality of resonance points occurs downstream and upstream of the intermediate transfer gear. At these resonance points, the drive transmission unit can vibrate. Accordingly, if the drive transmission unit is applied to a drive unit of an intermediate transfer belt of an image forming apparatus, vibrations of the drive transmission unit can result in color unevenness. Here, the need of setting the feedback control frequency for the drive motor to a frequency lower than a lowest one of the plurality of resonance frequencies occurring on the drive transmission path arises.

In the present implementation example, a rotary drive device 60 is used as a rotary drive unit of the intermediate transfer belt 10 of FIG. 1. The rotary drive device 60 transmits a rotational drive force of a drive motor 61, which is a drive source, to the intermediate transfer belt 10 via the drive roller 11, on which the intermediate transfer belt 10 is wound and supported, of FIG. 1. As illustrated in FIG. 3, the drive motor 61 includes a drive shaft 62 made of a metal material. A toothed drive gear 62a is formed on an outer peripheral surface of the drive shaft 62. The drive gear 62a meshes with an intermediate transfer gear 63 made of the resin material at a mesh 68 to transmit the drive force of the drive motor 61 to the intermediate transfer gear 63.

As illustrated in FIGS. 3 and 4A, through holes 63a, through which screws 69 are to extend, are defined through the intermediate transfer gear 63 in the thickness direction of the intermediate transfer gear. First through holes 64a, through which the screws 69 are to extend, are defined through a metal member 64, which is a high stiffness member, in the thickness direction of the metal member 64. The screws 69 are inserted through the through holes 63a and the first through holes 64a, thereby fastening the metal member 64 to the intermediate transfer gear 63. Furthermore, the intermediate transfer gear 63 is configured to be rotatable jointly with an output shaft 65, which is a driven shaft, via a parallel pin 66, which is a coupling member forcibly fitted in the output shaft 65 perpendicularly to the axial direction of the output shaft 65, and transmits a drive force from the drive motor 61 to the output shaft 65 via the metal member 64. A second through hole 64b, in which the output shaft 65 is to be fitted, and third through holes 64c, which are in communication with the second through hole 64b and in which the parallel pin 66 is to be fitted, are defined in the metal member 64. An inner opening diameter of the second through hole 64b is slightly smaller than an outer diameter of the output shaft 65. The opening of the third through holes 64c has a cross section shaped so as to make a contact with an outer peripheral surface of the parallel pin 66. The output shaft 65 is configured to be joined to the drive roller 11 so as to have a common center of rotation and drive the intermediate transfer belt 10 of FIG. 1 via the drive roller 11.

As illustrated in FIGS. 3, 4B, and 4C, a disk-type encoder 67 is attached to a second side surface of the intermediate transfer gear 63. The second side surface is on the side opposing, in a face-width direction of the intermediate transfer gear 63, a first side surface where the metal member 64 is arranged. An encoder sensor, which is the rotation-information detector 218 of FIG. 2, is arranged at a radially outer side of the encoder 67 to detect rotation information of the encoder 67. The drive motor 61 and the encoder sensor are electrically connected to the main-body controller 200 of FIGS. 1 and 2. A first through hole 67a and second through holes 67b, which are in communication with the first through hole 67a, are defined in the encoder 67. The output shaft 65 and the parallel pin 66, with the parallel pin 66 inserted through the output shaft 65, are assembled to the drive transmission portion through the first through hole 67a and the and second through holes 67b. Similarly, a through hole and second through holes 63b, which are in communication with the through hole, are defined in the intermediate transfer gear 63. The output shaft 65 and the parallel pin 66 are to pass through the through hole and the second through holes 63b.

The main-body controller 200 reduces rotational variation of the intermediate transfer belt 10 by feedback-controlling the rotation speed of the drive motor 61 based on the rotation information fed from the encoder sensor. Resonance frequencies of members on a drive transmission path from the drive motor 61 to a to-be-driven rotor and an insertion connection(s) between the members are factors considerably affecting the feedback control. If the resonance frequencies are low, a delay of rotation of the encoder 67 relative to rotation of the drive motor 61 occurs, making it difficult to perform feedback control as intended. As a result, resonance of a rotating system occurs at a low frequency. Feedback control is generally performed at a frequency lower than resonance frequencies. For this reason, as the resonance frequency decreases, an upper limit of feedback control frequencies decreases, and a control range of the feedback control is narrowed, making it difficult to perform control as intended. Consequently, vibrations occur in the intermediate transfer belt, and anomaly in image formation such as out of color registration or color unevenness occurs. Furthermore, in a condition where amplitude at the resonance frequency on the drive transmission path is high (i.e., gain (amplification factor) is high), the feedback control frequency is desirably set to a frequency still lower than the lowest resonance frequency to avoid influence of resonance. This is because it is necessary to design a control system so as to guarantee a gain margin.

More specifically, it is desirable to set the feedback control frequency to a frequency sufficiently higher than a frequency of rotational variation of the drive motor and, simultaneously, to set the feedback control frequency to a frequency sufficiently lower than the lowest resonance frequency on the drive transmission path. Increasing the feedback control frequency is desired to achieve reduction in variation of rotational speed of the drive motor more accurately. For this purpose, it is desired to increase the lowest resonance frequency on the drive transmission path as high as possible and to lower the gain at the resonance frequency. A resonance frequency and its gain depend on stiffness of a drive transmission member of a corresponding drive transmission portion. Examples of a factor affecting the resonance frequency and its gain include torsional stiffness of a gear and stiffness at an insertion connection between gears.

In the rotary drive device 60 of the present implementation example, stiffness of the intermediate transfer gear 63 is increased by fastening the metal member 64, which is a high stiffness member, to a base of the intermediate transfer gear 63 with the screws 69 as illustrated in FIG. 3. By fitting the parallel pin 66 in the metal member 64, insertion-connection stiffness at this insertion connection is also increased. Consequently, resonance frequency at a contact portion between a tooth face of the drive gear 62a and a tooth face of the intermediate transfer gear 63 and that at the mesh 68 where the parallel pin 66 is fitted in the metal member 64 are increased. Furthermore, by configuring the encoder 67 jointly with the intermediate transfer gear 63, a resonance point and an antiresonance point are brought close to each other. As a result, because resonance at the resonance point is canceled out by antiresonance at the antiresonance point, a gain at the resonance point is lowered, and controllability can be maintained.

Referring to FIG. 3, the drive force of the drive motor 61 is transmitted to the driven rotor via the following drive transmission path. The drive force is transmitted via the following elements in this order: the drive shaft 62 of the drive motor 61, the mesh 68 between the drive gear 62a and the intermediate transfer gear 63, the intermediate transfer gear 63 (where the encoder 67 is arranged), the metal member 64, the parallel pin 66, and the output shaft 65. Resonance occurring at any one of the mesh 68 and the drive motor 61, which are upstream in the drive transmission direction than the position where the encoder 67 is set on the intermediate transfer gear 63, is observed as resonance that amplifies a gain in gain-frequency response characteristics at a position where the rotation speed of the encoder 67 is detected. Resonance occurring at any one of the metal member 64, the insertion connection between the metal member 64 and the parallel pin 66, the parallel pin, the output shaft 65, and other portions (including the drive roller 12 and the intermediate transfer belt 10), which are downstream in the drive transmission direction than the position where the encoder 67 is placed on the intermediate transfer gear 63, is observed as resonance that reduces a gain in the gain-frequency response characteristics at the position where the rotation speed of the encoder 67 is detected. Thus, points where resonance and antiresonance occur approach each other depending on the position where the encoder 67 is arranged. If the encoder is arranged downstream in the drive transmission direction (for example, at the drive roller) and resonance points, at each of which resonance occurs, upstream than the position where the encoder is arranged on the drive transmission path in a drive transmission direction are close to each other, the resonances are superimposed to produce a strong resonance, making the control difficult. However, when, as in the present implementation example, the encoder is configured jointly with the intermediate transfer gear and the metal member is attached to the intermediate transfer gear, a lowest resonance frequency is increased and, furthermore, an antiresonance point is brought close to a resonance point. As a result, resonance at the resonance point can be canceled out by antiresonance at the antiresonance point.

Figure 5:
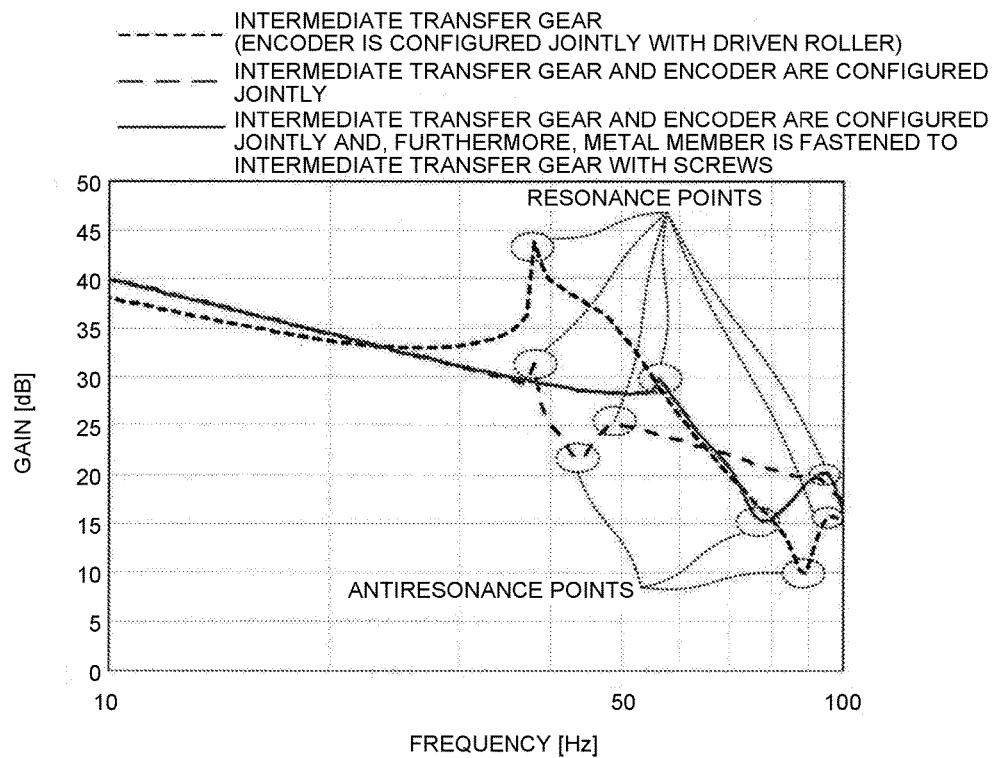
FIG. 5 is a graph illustrating gain-frequency response characteristics.

FIG. 5 is a graph illustrating gain-frequency response characteristics. In the Bode diagram of FIG. 5, the short-dashed line indicates gain-frequency response characteristics of a configuration where the encoder is configured separately from the intermediate transfer gear such that, for example, the encoder is arranged on the driven roller. Referring to the frequency response indicated by the short-dashed line, resonances at a plurality of points upstream than a position where the encoder is placed in the drive transmission direction are superimposed on each other, causing a resonance point (resonance frequency: 38 Hz; gain: 44 dB) and an antiresonance point (resonance frequency: 89 Hz; gain: 10 dB), which is considerably away from the resonance point, to appear. This result indicates that it is difficult to cancel out resonance with antiresonance. Furthermore, because a gain at the resonance point is considerably strong, it is difficult to control the drive motor.

The long-dashed line of FIG. 5 indicates gain-frequency response characteristics of a configuration where the encoder is configured jointly with the intermediate transfer gear. Referring to the frequency response indicated by the long-dashed line, resonance (resonance frequency: 38 Hz; gain: 32 dB) occurs at the contact portion between the tooth face of the drive gear 62a and the tooth face of the intermediate transfer gear 63 at the mesh 68, while antiresonance (resonance frequency: 43 Hz; gain: 22 dB) occurs at the portion where the parallel pin 66 is fitted in the output shaft 65. Because the antiresonance point appears close to the resonance point in this manner, the resonance at the resonance point can be canceled out by the antiresonance at the antiresonance point, and therefore a gain at the resonance point is reduced. However, resonance frequency at the resonance point remains the same as resonance frequency at the resonance point indicated by the short-dashed line. Accordingly, the control range of the feedback control is not widened sufficiently.

Referring to the frequency response of the present implementation example indicated by the solid line in FIG. 5, resonance (resonance frequency: 56 Hz; gain: 30 dB) occurs at the contact portion between the tooth face of the drive gear 62a and the tooth face of the intermediate transfer gear 63 at the mesh 68, while antiresonance (resonance frequency: 76 Hz; gain: 15 dB) occurs at the portion where the parallel pin 66 is fitted in the metal member 64. Because the antiresonance point appears close to the resonance point, the resonance at the resonance point can be canceled out by the antiresonance at the antiresonance point, and therefore a gain at the resonance point is reduced. Furthermore, a lowest one of resonance frequencies at the resonance points is higher than that of the resonance points indicated by the short-dashed line or the long-dashed line in FIG. 5. Accordingly, because the feedback control frequency can be set high, the control range of the feedback control can be widened sufficiently.

In the implementation example described above, the cross-sectional shape of the opening of through hole in the metal member is tailored to the shape of the parallel pin so that the metal member can be fitted in the output shaft using the parallel pin. Alternatively, the following configuration may be employed. The cross section of the output shaft taken perpendicularly to the axial direction is D-shaped or oval-shaped at a position where the metal member is fitted in the output shaft. The internal shape of the through hole in the metal member is D-shaped or oval-shaped, so that the metal member is fitted in the output shaft. With this configuration, an antiresonance point appears at a portion where the metal member is fitted in the output shaft in the frequency response. The antiresonance point appears near the resonance point corresponding to the contact portion between the tooth face of the drive gear and the tooth face of the intermediate transfer gear. Accordingly, the resonance at the resonance point can be canceled out by the antiresonance at the antiresonance point, and therefore the gain at the resonance point can be reduced. In the implementation example, the through hole, in which the parallel pin is to be fitted, is defined in the metal member. In lieu of the through hole, a groove whose inner wall surface is brought into contact with the outer peripheral surface of the parallel pin may be provided.

First Modification

A modification (hereinafter, "first modification") of the rotary drive device of the above-described embodiment is described below.

Figure 6:
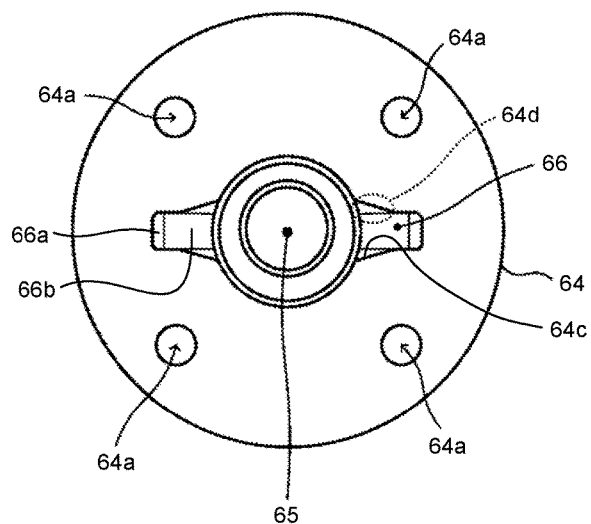
FIG. 6 is a diagram describing a state, in which a parallel pin is fitted in the metal member, of a first modification.

FIG. 6 is a diagram describing a state, in which the parallel pin is fitted in the metal member, of the first modification.

At the insertion connection where the parallel pin 66 is fitted in the metal member 64, the outer peripheral surface of the parallel pin 66 and an inner circumferential surface of the opening of the third through hole 64c of the metal member 64 make a point contact due to a backlash caused by a manufacturing error and the like. The point contact can occur at a position close to the shaft center of the output shaft 65. When the point contact position is close to the shaft center, a large drive torque is required of the output shaft 65. However, in the first modification, as illustrated in FIG. 6, a distal end portion 66a of the parallel pin 66 is in contact with the inner circumferential surface of the opening of the third through hole 64c of the metal member 64. Furthermore, a cross-sectional shape of the second through hole 64c partially has such a contact-avoiding shape 64d where the inner circumferential surface of the opening of the third through hole 64c is gradually spaced away from the outer peripheral surface of the parallel pin 66 from the distal end portion 66a of the parallel pin 66 toward the output shaft 65. With this configuration, the contact portion between the metal member 64 and the distal end portion 66a of the parallel pin 66 is located away from the shaft center of the output shaft 65. As a result, a force transmitted from the metal member 64 to the distal end portion 66a of the parallel pin 66 at the contact portion between the metal member 64 and the distal end portion 66a is advantageously smaller than that at a basal portion 66b of the parallel pin 66. Accordingly, a stress applied to the parallel pin 66 at the contact portion between the metal member 64 and the distal end portion 66a of the parallel pin 66 can be reduced. Because usable life and replacement interval of the parallel pin 66 can be extended, running cost can be reduced.

Second Modification

Another modification (hereinafter, "second modification") of the rotary drive device of the above-described embodiment is described below.

Figure 7A:
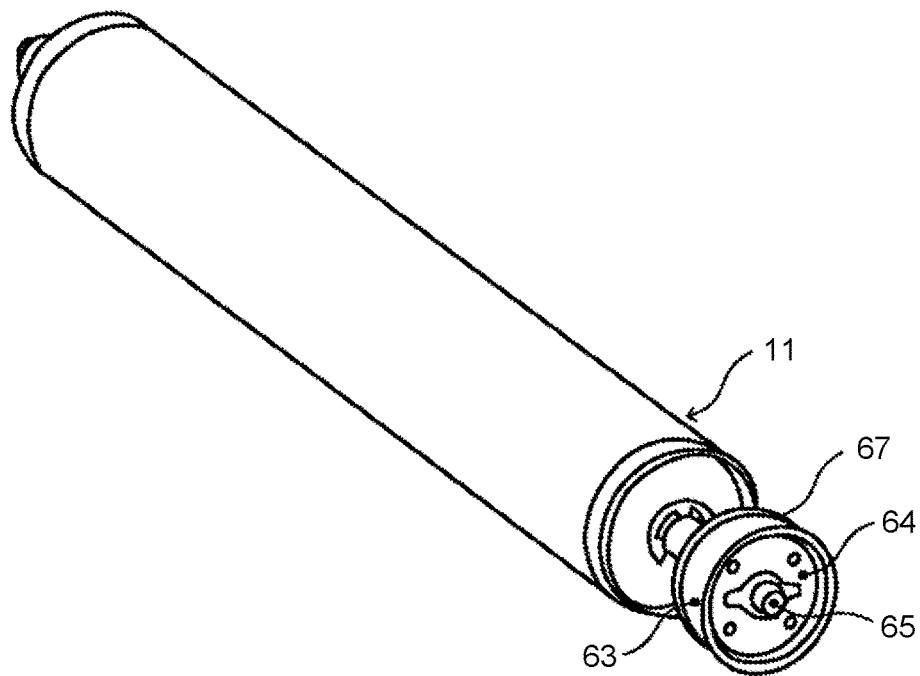
FIGS. 7A and 7B are respectively a perspective view of a drive transmission portion assembled to a driving roller of a second modification and a plan view of the drive transmission portion.
Figure 7B:
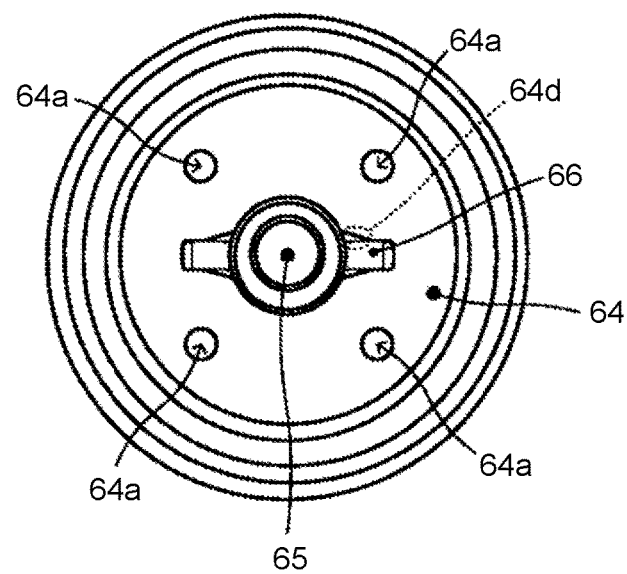

FIGS. 7A and 7B are diagrams describing a configuration of a drive transmission portion and the drive roller of the second modification. FIG. 7A is a perspective view of the drive transmission portion assembled onto the driving roller. FIG. 7B is a plan view of the drive transmission portion.

If the drive roller 11 is eccentric, rotational variation in one rotation of the drive roller 11 occurs. To prevent producing an image out of color registration, it is desirable to reduce eccentricity of the drive roller 11. In the second modification, the encoder 67 is attached to the intermediate transfer gear 63 first, and the metal member 64 is fastened to the intermediate transfer gear 63 with screws 69. The output shaft 65 of the drive roller 11 is inserted through the intermediate transfer gear 63 and the metal member 64, thereby assembling the metal member 64 onto the output shaft 65 using the parallel pin 66. The shape of the metal member 64 is formed so that the center of gravity of the entire drive transmission portion including the drive roller 11 and the intermediate transfer gear 63 assembled in this manner coincides with the shaft center of the output shaft 65 of the drive roller 11. Consequently, eccentricity of the drive roller 11 can be reduced and rotational variation in one rotation of the drive roller can reduced.

Those described above are only exemplary, and each aspect of the present invention described below provides an advantage(s) specific to the aspect.

Aspect A

According to one aspect (Aspect A), the rotary drive device 60 includes the drive motor 61, a drive transmission portion (e.g., the drive gear 62a, the intermediate transfer gear 63) configured to transmit a rotational drive force of the drive motor to a driven rotor (e.g., the drive roller 11), and a rotation information detector (e.g., the encoder 67) configured to detect rotation information of the driven rotor, and controls a drive signal to be fed to the drive motor based on the rotation information of the driven rotor obtained by the rotation information detector so as to cause a rotation speed of the drive motor to achieve a target rotation speed. The drive transmission portion includes three or more drive transmission members. A high stiffness member (e.g., the metal member 64) is attached to a low-stiffness drive transmission member, which is one, the one being lower in stiffness, of two drive transmission members forming a drive transmission point corresponding a resonant point of a lowest resonance frequency among frequencies at a plurality of resonance points in frequency response characteristics derived from the rotation information of the drive transmission members, to increase stiffness of the low-stiffness drive transmission member. One drive transmission point of the low-stiffness drive transmission member, the one drive transmission point being on any one of a drive-transmission input side and a drive-transmission output side, other than the drive transmission point corresponding to the resonant point of the lowest resonance frequency is configured to transmit the rotational drive force through the high stiffness member.

In the present aspect, when the drive motor 61 is driven, a rotational drive of the drive motor is transmitted to the driven rotor via the three or more drive transmission members. According to the present aspect, stiffness of the low-stiffness drive transmission member, which is the lower one in stiffness of the two drive transmission members forming the drive transmission point corresponding the resonant point of the lowest resonance frequency, can be increased by attaching the high stiffness member to the low-stiffness drive transmission member. As a result, because frequencies of transmission variations at the drive transmission points on the drive-transmission input side and the drive-transmission output side can be increased, the lowest resonance frequency can be increased.

The inventors of the present invention have intensively studied and found the following. That is, in addition to a resonance point where vibrations are amplified due to resonance, an antiresonance point where vibrations are attenuated appear in frequency response characteristics. If the antiresonance point can be brought close to the resonance point where the lowest resonance frequency appears, resonance at the resonance point can be canceled out by antiresonance at the antiresonance point, and therefore a gain at the resonance point of the lowest resonance frequency can be reduced.

Generally, as stiffness of a drive transmission member decreases, frequencies of periodic transmission variations on a drive-transmission input side and a drive-transmission output side of the drive transmission member decrease. Accordingly, a lowest resonance frequency appears in frequency resonance characteristics on either a drive-transmission input side or a drive-transmission output side of a drive transmission member that is lowest in stiffness among a plurality of drive transmission members. The drive transmission member that is the lowest in stiffness (i.e., the low-stiffness drive transmission member described above) generally produces resonance of a second lowest frequency on one, other than the drive transmission point where the lowest resonance frequency appears, of a drive transmission point on the drive-transmission input side and that on the drive-transmission output side. To obtain antiresonance for canceling out resonance at the lowest resonance frequency, it is necessary to cause antiresonance of a frequency close to the lowest resonance frequency to be produced by periodic transmission variation at a position other than a position where resonance at the lowest resonance frequency occurs. An antiresonance point appears at a frequency next lower or next higher than a resonance frequency. Accordingly, to obtain antiresonance, with which the resonance at the lowest resonance frequency can be canceled out, it is effective to adjust a frequency of periodic transmission variation at a drive transmission point where resonance at the second lowest resonance frequency occurs to thereby bring an antiresonance point corresponding to this drive transmission point close to the lowest resonance frequency.

In the present implementation example, the drive transmission point of the low-stiffness drive transmission member on the side, which is any one of the drive-transmission input side and the drive-transmission output side, other than the side corresponding to the resonance point of the lowest resonance frequency is the drive transmission point where resonance at the second lowest resonance frequency occurs. According to the present implementation example, by attaching the high stiffness member to the low-stiffness drive transmission member, frequencies of transmission variations at the drive transmission points on both the drive-transmission input side and the drive-transmission output side can be increased. Note that, according to the present implementation example, at the drive transmission point where the resonance at the second lowest resonance frequency is produced, the rotational drive force is transmitted through the high stiffness member. Therefore, frequency of periodic transmission variation at this drive transmission point is increased by a ratio greater than that at the drive transmission point, corresponding to the lowest resonance frequency, at which the rotational drive force is transmitted without passing through the high stiffness member. This ratio is appropriately adjustable by adjusting stiffness and/or an attachment manner of the high stiffness member.

Thus, according to the present implementation example, by using the high stiffness member, it is possible not only to increase the lowest resonance frequency but also to adjust the antiresonance point corresponding to the drive transmission point where resonance at the second lowest resonance frequency occurs close to the lowest resonance frequency. Accordingly, because the lowest resonance frequency can be increased and, simultaneously, the gain at the lowest resonance frequency can be reduced, the control range of the feedback control can be widened sufficiently. Hence, variation in rotation speed of the drive motor can be reduced more accurately.

Aspect B

According to another aspect (Aspect B), in the one aspect (Aspect A), the high stiffness member is attached to one, the one being lowest in stiffness, of the three or more drive transmission members. According to this aspect, as described above in the embodiment, generally, as stiffness of a drive transmission member decreases, frequencies of periodic transmission variations at drive transmission points on a drive-transmission input side and a drive-transmission output side of the drive transmission member decrease. For this reason, a lowest resonance frequency, which limits a control range of feedback control of a drive motor, results from periodic transmission variation on either a drive-transmission input side or a drive-transmission output side of a drive transmission member included in a drive transmission portion. In the present aspect, the high stiffness member is attached to one, the one being the lowest in stiffness, of the three or more drive transmission members. Accordingly, stiffness of the one drive transmission member is increased. At the drive transmission point formed with the drive transmission member, a cycle period of the transmission variation is shortened, and resonance frequency (the lowest resonance frequency) at the resonance point corresponding to the drive transmission point is increased.

Aspect C

According to still another aspect (Aspect C), in any one of the aspects (Aspect A or Aspect B), the high stiffness member is fastened to the drive transmission member with the screw 69. According to this aspect, as described above in the embodiment, by fastening the high stiffness member to the drive transmission member with the screw 69, the stiffness of the drive transmission member is further increased. As a result, at the drive transmission point formed with the drive transmission member, a cycle period of transmission variation is shortened and, accordingly, resonance frequency (the lowest resonance frequency) at the resonance point corresponding to the drive transmission point is increased.

Aspect D

According to still another aspect (Aspect D), in any one of the aspects (one of Aspect A to Aspect C), the high stiffness member includes a through hole, through which a driven shaft of the driven rotor is to extend. The opening of the through hole has a cross-sectional shape allowing the driven shaft to be fitted in the through hole and being substantially the same as a cross-sectional shape, taken perpendicularly to the axial direction of the driven shaft, of the driven shaft. According to this aspect, as described above in the embodiment, there is an insertion connection where the high stiffness member is fitted in the driven shaft. Because the driven shaft is generally made of a metal material, torsional stiffness at the insertion connection between the driven shaft and the high stiffness member is relatively high. As a result, a cycle period of transmission variation at the insertion connection is shortened, and resonance frequency at the insertion connection is increased.

Aspect E

According to still another aspect (Aspect E), in the aspect (Aspect D), the opening of the through hole in the high stiffness member has any one of a D-shaped cross-sectional shape and an oval cross-sectional shape. According to this aspect, as described above in the embodiment, there is an insertion connection where the high stiffness member is fitted in the driven shaft. Because the driven shaft is generally made of a metal material, torsional stiffness at the insertion connection between the driven shaft and the high stiffness member is relatively high. As a result, a cycle period of transmission variation at the insertion connection is shortened, and resonance frequency at the insertion connection is increased.

Aspect F

According to still another aspect (Aspect F), in any one of the aspects (one of Aspect A to Aspect E), the high stiffness member is fitted in the drive shaft using a coupling member for coupling to the driven shaft. According to this aspect, as described above in the embodiment, there are an insertion connection between the high stiffness member and the driven shaft and a coupling between the coupling member and the driven shaft. Because the coupling member and the driven shaft are each generally made of a metal material, torsional stiffness at the insertion connection between the driven shaft and the high stiffness member and that at the coupling between the coupling member and the driven shaft are relatively high. Accordingly, a cycle period of transmission variation at the insertion connection and that at the coupling are shortened, and resonance frequency at the insertion connection and that at the coupling are increased.

Aspect G

According to still another aspect (Aspect G), in the aspect (Aspect F), the high stiffness member includes a groove, in which the coupling member is to be fitted. According to this aspect, as described above in the embodiment, by fitting the coupling member in the groove of the high stiffness member, the high stiffness member and the coupling member are coupled securely. As a result, torsional stiffness at a contact portion between the high stiffness member and the coupling member is increased. Accordingly, a cycle period of transmission variation at the contact portion is shortened, and resonance frequency at the contact portion is increased.

Aspect H

According to still another aspect (Aspect H), in the aspects (Aspect D and Aspect F), the coupling member is the cylindrical parallel pin 66. The distal end portion of the parallel pin is in contact with a contact portion of an inner circumferential surface of the opening of the through hole. The other portion of the cross-sectional shape of the opening of the through hole than the contact portion assumes a contact-avoiding shape where the parallel pin is free from contact with the inner circumferential surface of the opening of the through hole. According to this aspect, as described above in the first modification of the embodiment, the distal end portion of the parallel pin is in contact with the inner circumferential surface of opening of the through hole of the high stiffness member. By contrast, the basal portion of the parallel pin is out of contact with the inner circumferential surface of opening of the through hole of the high stiffness member. Accordingly, the contact portion between the high stiffness member and the distal end portion of the parallel pin is located away from the shaft center of the driven shaft. As a result, the force to be transmitted from the high stiffness member to the distal end portion of the parallel pin at the contact portion between the high stiffness member and the distal end portion is advantageously smaller than that at the basal portion of the parallel pin. Accordingly, a stress applied to the parallel pin at the contact portion between the high stiffness member and the distal end portion of the parallel pin can be reduced. Because usable life and replacement interval of the parallel pin can be extended, running cost can be reduced.

Aspect I

According to still another aspect (Aspect I), in any one of the aspects (one of Aspect A to Aspect H), the shape of the high stiffness member is formed so that a shaft center of a driven shaft of the driven rotor substantially coincides with the center of gravity of entirety of the drive transmission portion and the driven rotor. According to this aspect, as described above in the second modification of the embodiment, rotational variation in one rotation of the drive roller can reduced.

Aspect J

In an image forming apparatus (e.g., the printer 100) including a plurality of driven rotors and rotary drive units each configured to exert a rotational drive force to a corresponding one of the driven rotors, each of the rotary drive units is the rotary drive device according to any one of the aspects (one of Aspect A to Aspect I). According to this aspect, as described above in the embodiment, for example, by using the rotary drive device described above as each of the rotary drive units for the driven rotors such as an image bearer and an intermediate transfer roller, an image of high quality free from out of color registration and free from color unevenness can be formed.

According to an aspect of the present invention, a control range of feedback control can be advantageously widened sufficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotary drive device comprising:
a drive motor;
a drive transmission portion configured to transmit a rotational drive force of the drive motor to a driven rotor; and
a rotation information detector configured to detect rotation information of the driven rotor,
a drive signal to be fed to the drive motor being controllable based on the rotation information of the driven rotor obtained by the rotation information detector so as to cause a rotation speed of the drive motor to achieve a target rotation speed,
the drive transmission portion including three or more drive transmission members,
a high stiffness member being attached to a low-stiffness drive transmission member, the low-stiffness drive transmission member being one, the one being relatively lower in stiffness, of two drive transmission members forming a drive transmission point corresponding a resonant point of a relatively lowest resonance frequency among frequencies at a plurality of resonance points in frequency response characteristics derived from the rotation information of the drive transmission members, to increase stiffness of the low-stiffness drive transmission member,
one drive transmission point of the low-stiffness drive transmission member, the one drive transmission point being on any one of a drive-transmission input side and a drive-transmission output side, other than the drive transmission point corresponding to the resonant point of the relatively lowest resonance frequency being configured to transmit the rotational drive force through the high stiffness member.

2. The rotary drive device according to claim 1, wherein the high stiffness member is attached to one, the one being relatively lowest in stiffness, of the three or more drive transmission members.

3. An image forming apparatus comprising:
a plurality of driven rotors; and
rotary drive units each configured to exert a rotational drive force to a corresponding one of the driven rotors,
each of the rotary drive units being the rotary drive device according to claim 2.

4. The rotary drive device according to claim 1, wherein the high stiffness member is fastened to the drive transmission member with a screw.

5. An image forming apparatus comprising:
a plurality of driven rotors; and
rotary drive units each configured to exert a rotational drive force to a corresponding one of the driven rotors,
each of the rotary drive units being the rotary drive device according to claim 4.

6. The rotary drive device according to claim 1, wherein the high stiffness member includes a through hole, through which a driven shaft of the driven rotor is to extend, opening of the through hole having a cross-sectional shape allowing the driven shaft to be fitted in the through hole and being substantially the same as a cross-sectional shape, taken perpendicularly to axial direction of the driven shaft, of the driven shaft.

7. The rotary drive device according to claim 6, wherein the opening of the through hole in the high stiffness member has any one of a D-shaped cross-sectional shape and an oval cross-sectional shape.

8. An image forming apparatus comprising:
a plurality of driven rotors; and
rotary drive units each configured to exert a rotational drive force to a corresponding one of the driven rotors,
each of the rotary drive units being the rotary drive device according to claim 7.

9. The rotary drive device according to claim 6, wherein the high stiffness member is fitted in a driven shaft of the driven rotor using a coupling member for coupling to the driven shaft,
the coupling member is a cylindrical parallel pin,
a distal end portion of the parallel pin is in contact with one portion of an inner circumferential surface of the opening of the through hole, and
the other portion of the cross-sectional shape of the opening of the through hole other than a contact portion, the contact portion being the one portion, assumes a contact-avoiding shape where the parallel pin is free from contact with the inner circumferential surface of the opening of the through hole.

10. An image forming apparatus comprising:
a plurality of driven rotors; and
rotary drive units each configured to exert a rotational drive force to a corresponding one of the driven rotors,
each of the rotary drive units being the rotary drive device according to claim 9.

11. An image forming apparatus comprising:
a plurality of driven rotors; and rotary drive units each configured to exert a rotational drive force to a corresponding one of the driven rotors, each of the rotary drive units being the rotary drive device according to claim 6.

12. The rotary drive device according to claim 1, wherein the high stiffness member is fitted in a driven shaft of the driven rotor using a coupling member for coupling to the driven shaft.

13. The rotary drive device according to claim 12, wherein the high stiffness member includes a groove, in which the coupling member is to be fitted.

14. An image forming apparatus comprising:

a plurality of driven rotors; and rotary drive units each configured to exert a rotational drive force to a corresponding one of the driven rotors, each of the rotary drive units being the rotary drive device according to claim 13.

15. An image forming apparatus comprising:

a plurality of driven rotors; and rotary drive units each configured to exert a rotational drive force to a corresponding one of the driven rotors, each of the rotary drive units being the rotary drive device according to claim 12.

16. The rotary drive device according to claim 1, wherein shape of the high stiffness member is formed so that a shaft center of a driven shaft of the driven rotor substantially coincides with center of gravity of entirety of the drive transmission portion and the driven rotor.

17. An image forming apparatus comprising:

a plurality of driven rotors; and rotary drive units each configured to exert a rotational drive force to a corresponding one of the driven rotors, each of the rotary drive units being the rotary drive device according to claim 16.

18. An image forming apparatus comprising:

a plurality of driven rotors; and rotary drive units each configured to exert a rotational drive force to a corresponding one of the driven rotors, each of the rotary drive units being the rotary drive device according to claim 1.

\* \* \* \* \*